(12) United States Patent
Kim et al.

(10) Patent No.: US 9,797,466 B2
(45) Date of Patent: Oct. 24, 2017

(54) DAMPING FORCE VARIABLE TYPE SHOCK ABSORBER

(71) Applicant: MANDO CORPORATION, Pyeongtaek-si, Gyeonggi-do (KR)

(72) Inventors: Hark Joo Kim, Seoul (KR); Ki Don Jung, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 14/989,544

(22) Filed: Jan. 6, 2016

(65) Prior Publication Data

US 2016/0201752 A1    Jul. 14, 2016

(30) Foreign Application Priority Data

Jan. 9, 2015    (KR) .......................... 10-2015-0003583

(51) Int. Cl.
| F16F 9/512 | (2006.01) |
| F16F 9/18  | (2006.01) |
| F16F 9/34  | (2006.01) |

(52) U.S. Cl.
CPC .............. *F16F 9/512* (2013.01); *F16F 9/182* (2013.01); *F16F 9/185* (2013.01); *F16F 9/34* (2013.01)

(58) Field of Classification Search
CPC .... F16F 9/512; F16F 9/185; F16F 9/34; F16F 9/182

(Continued)

(56) References Cited

U.S. PATENT DOCUMENTS 5,129,488 A * 7/1992 Furuya ................... B60G 17/08
                                                       188/282.6
5,386,892 A * 2/1995 Ashiba ..................... F16F 9/516
                                                       188/280

(Continued)

*Primary Examiner* — Thomas J Williams
*Assistant Examiner* — Mariano Sy
(74) *Attorney, Agent, or Firm* — McDermott Will & Emery LLP

(57) ABSTRACT

A damping force variable type shock absorber includes: a piston rod reciprocating within the cylinder; a piston valve connected to the piston rod to partition the cylinder into a compression chamber and a rebound chamber; a housing including an auxiliary chamber communicating with a connection passage penetrating an inside of the piston rod in a longitudinal direction of the piston rod, the housing being connected to a lower portion of the piston valve and forming an auxiliary passage connected to the compression chamber disposed thereunder; a first damping unit disposed in an upper side of the auxiliary chamber to form a first bypass passage communicating the connection passage with the auxiliary passage in a zigzag form, the first damping unit allowing a deformation according to a flow of a working fluid in a predetermined speed section; a second damping unit accommodated in the auxiliary chamber and disposed under the first damping unit to form a second bypass passage connected to the first bypass passage, the second damping unit allowing a deformation according to the flow of the working fluid in a predetermined speed section; and a seal unit accommodated in the auxiliary chamber and disposed under the first damping unit to vertically support the second damping unit. Accordingly, it is possible to improve ride comfort by bypassing the working fluid while allowing a deformation along the flow of the working fluid in a predetermined speed section.

7 Claims, 4 Drawing Sheets

(58) Field of Classification Search
USPC .............. 188/280, 313, 322.13, 322.15
See application file for complete search history.

(56) References Cited

U.S. PATENT DOCUMENTS

| | | | | |
|---|---|---|---|---|
| 6,918,473 | B2* | 7/2005 | Deferme | F16F 9/5126 188/282.1 |
| 8,844,687 | B2* | 9/2014 | Yu | F16F 9/5126 188/280 |
| 8,978,845 | B2* | 3/2015 | Kim | F16F 9/5126 188/275 |
| 9,080,634 | B2* | 7/2015 | Nowaczyk | F16F 9/50 |
| 9,194,457 | B2* | 11/2015 | Kim | F16F 9/5126 |
| 9,239,092 | B2* | 1/2016 | Nowaczyk | F16F 9/5126 |
| 2005/0045440 | A1* | 3/2005 | Kock | F16F 9/512 188/322.15 |
| 2012/0305352 | A1* | 12/2012 | Yu | F16F 9/5126 188/275 |
| 2015/0152936 | A1* | 6/2015 | Kim | F16F 9/3485 188/313 |
| 2015/0247546 | A1* | 9/2015 | Nowaczyk | F16F 9/512 188/313 |

* cited by examiner

[Fig. 1]
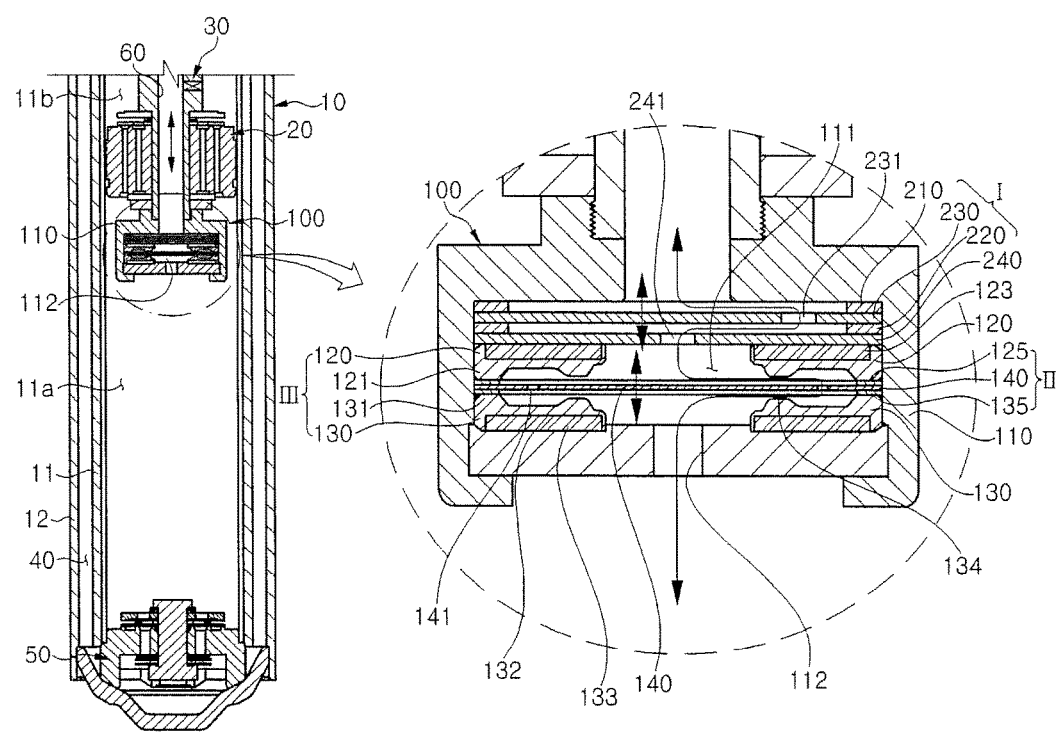

[Fig. 2]
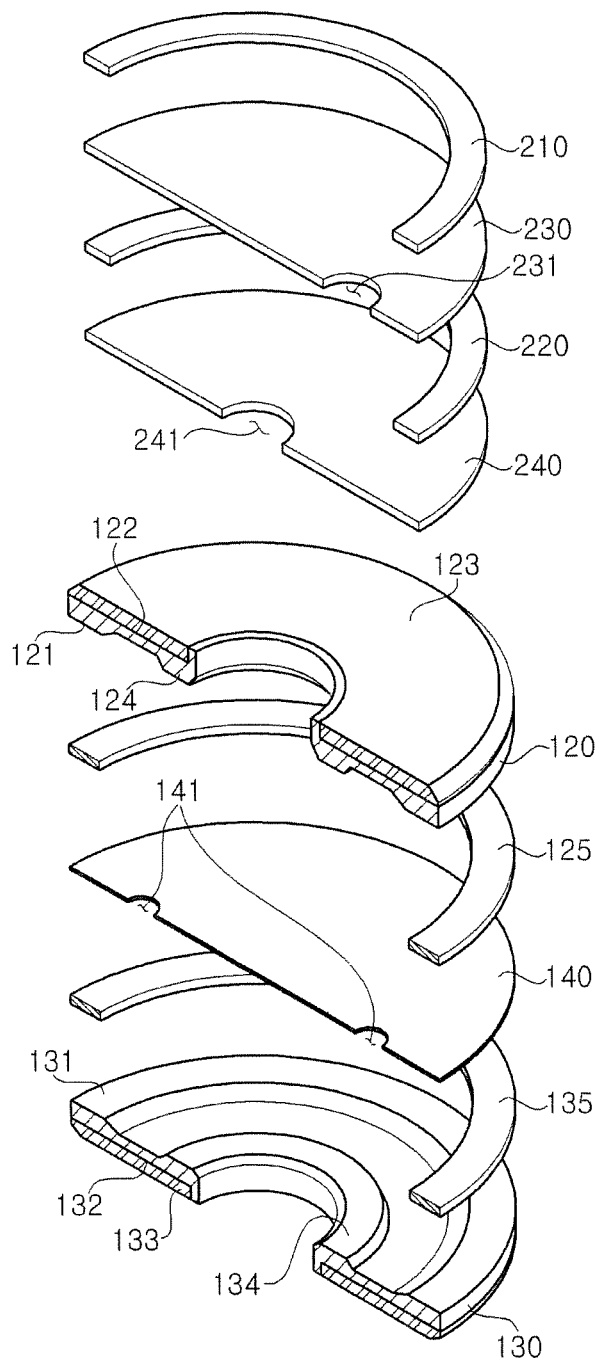

[Fig. 3]
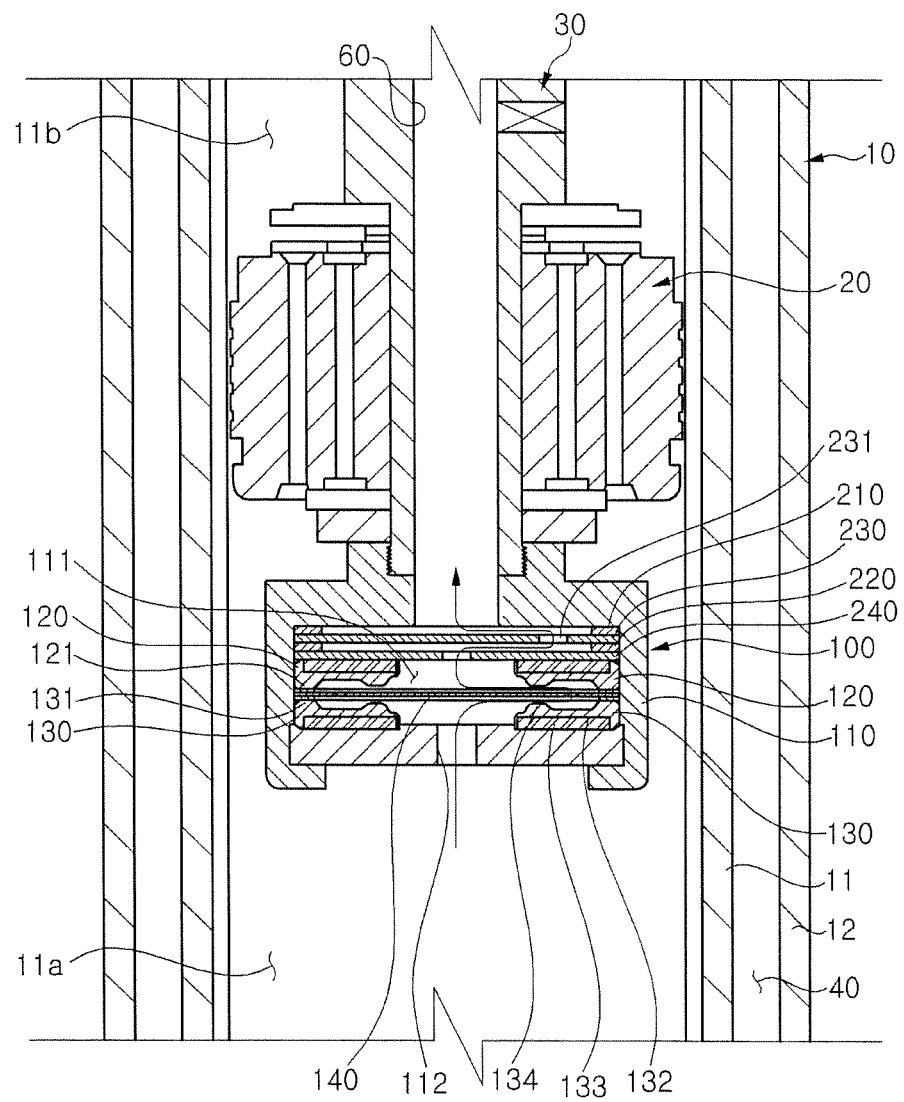

[Fig. 4]
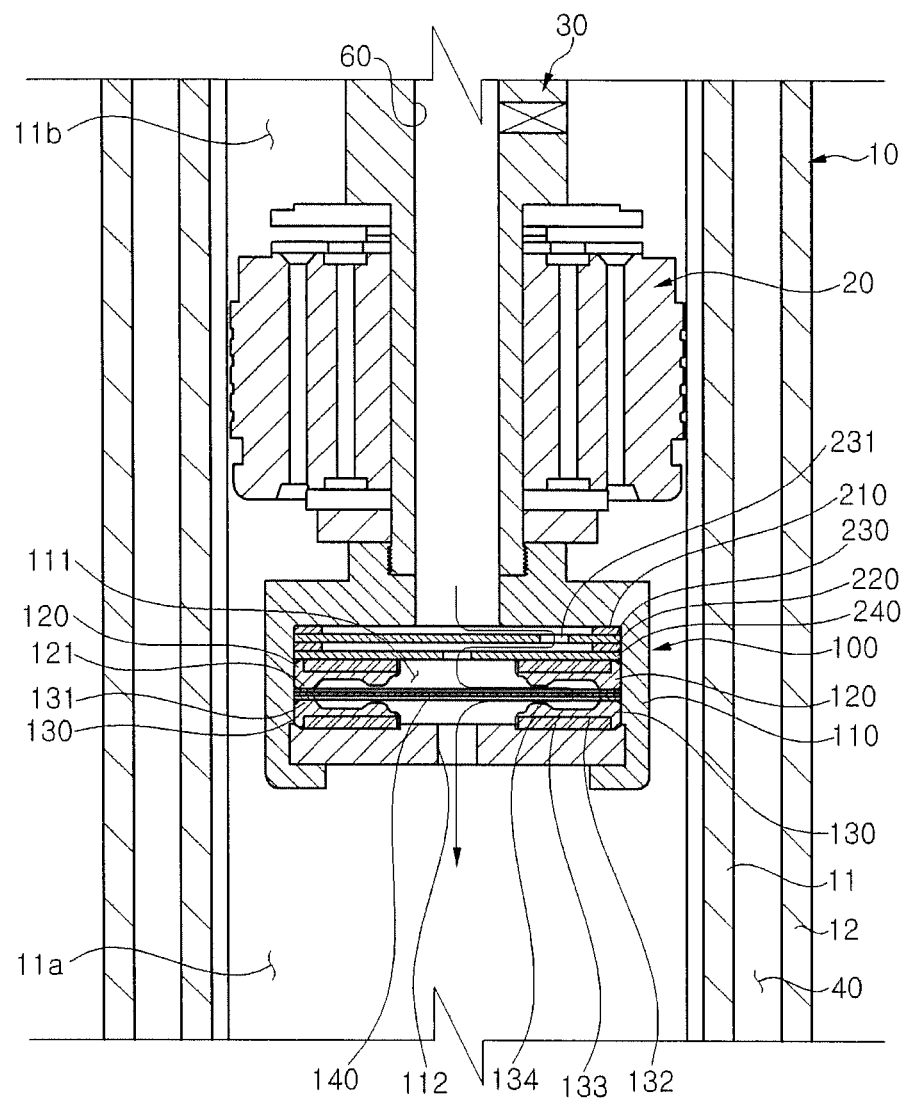

DAMPING FORCE VARIABLE TYPE SHOCK ABSORBER

CROSS-REFERENCE(S) TO RELATED APPLICATION

This application claims priority of Korean Patent Application No. 10-2015-0003583, filed on Jan. 9, 2015, in the Korean Intellectual Property Office, which is hereby incorporated by reference in its entirety.

BACKGROUND OF THE INVENTION

Field of the Invention

The present invention relates to a damping force variable type shock absorber, and more particularly, a damping force variable type shock absorber which implements a soft damping force to improve a ride comfort by bypassing a working fluid while allowing a deformation according to a flow of the working fluid in a predetermined speed section.

Description of the Related Art

In general, shock absorbers are used in vehicles so as to improve ride comfort by absorbing and damping a vibration or shock which is transferred from a road surface to an axle during driving.

Among these shock absorbers, a damping force variable type shock absorber operates according to a vibration of a vehicle based on a state of a road surface and varies a damping force according to an operating speed.

In such a conventional damping force variable type shock absorber, an auxiliary valve is installed so as to provide a soft damping force during a high-frequency stroke.

A conventional auxiliary valve includes a connection passage formed in a piston rod, a housing connected to the piston rod under a piston valve, and a spool installed to be vertically movable in the housing.

The auxiliary valve may generate a soft damping force by an operation of opening and closing a passage through a vertical movement.

However, the conventional damping force variable type shock absorber may generate a contact noise due to a shock caused by the vertical movement of the spool, and its structure may become complicated due to a large number of parts, resulting in an increase in a manufacturing cost.

CITATION LIST

Patent Literature

Korean Patent Application Publication No. 10-2015-0065062

SUMMARY OF THE INVENTION

The present invention has been made in an effort to solve the above problems and is directed to provide damping force variable type shock absorber which implements a soft damping force to improve a ride comfort by bypassing a working fluid while allowing a deformation according to a flow of the working fluid in a predetermined speed section.

According to an embodiment of the present invention, a damping force variable type shock absorber includes: a cylinder filled with a fluid; a piston rod reciprocating within the cylinder; a piston valve connected to the piston rod to partition the cylinder into a compression chamber and a rebound chamber; a housing including an auxiliary chamber communicating with a connection passage penetrating an inside of the piston rod in a longitudinal direction of the piston rod, the housing being connected to a lower portion of the piston valve and forming an auxiliary passage connected to the compression chamber disposed thereunder; a first damping unit disposed in an upper side of the auxiliary chamber to form a first bypass passage communicating the connection passage with the auxiliary passage in a zigzag form, the first damping unit allowing a deformation according to a flow of a working fluid in a predetermined speed section; a second damping unit accommodated in the auxiliary chamber and disposed under the first damping unit to form a second bypass passage connected to the first bypass passage, the second damping unit allowing a deformation according to the flow of the working fluid in a predetermined speed section; and a seal unit accommodated in the auxiliary chamber and disposed under the first damping unit to vertically support the second damping unit.

The first damping unit may include: a first spacer ring contacting an edge of an inner top surface of the auxiliary chamber; a second spacer ring disposed under the first spacer ring; and a first bypass disk disposed between the first spacer ring and the second spacer ring and including a first bypass orifice hole at a position spaced apart from a center thereof by a predetermined distance.

The damping force variable type shock absorber may further include a second bypass disk disposed between the second spacer ring and the seal unit and including a second bypass orifice hole penetrating through a center thereof.

The seal unit may include: an upper seal member, wherein a center of the upper seal member is penetrated vertically and an upper support protrusion protrudes along a lower edge of the upper seal member; and a lower seal member disposed under the upper seal member to support the second damping unit, wherein a center of the lower seal unit is penetrated vertically and a lower support protrusion protrudes along an upper edge of the lower seal member.

The second damping unit may include: a partition disk, upper and lower edges of which are supported by the seal unit, the partition disk partitioning the auxiliary chamber into an upper chamber and a lower chamber, an orifice hole penetrating through the partition disk so as to allow the working fluid to vertically move during a compression stroke and a rebound stroke; a ring-shaped upper support disk disposed at the upper edge of the partition disk such that the orifice hole is positioned in an inner space formed by the seal unit; and a ring-shaped lower support disk disposed at the lower edge of the partition disk such that the orifice hole is positioned in the inner space formed by the seal unit.

The seal unit may include: an upper seal member, wherein a center of the upper seal member is penetrated vertically and an upper support protrusion protrudes along a lower edge of the upper seal member; a ring-shaped upper stopper spaced apart from the upper support protrusion by a predetermined distance, disposed to be concentric with the upper support protrusion, and disposed on a bottom surface of the upper seal member, a lower end of the upper stopper being spaced apart from the partition disk; a lower seal member disposed under the upper seal member to support the second damping unit, wherein a center of the lower seal member is penetrated vertically and a lower support protrusion protrudes along an upper edge of the lower seal member; and a ring-shaped lower stopper spaced apart from the lower support protrusion by a predetermined distance, disposed to be concentric with the lower support protrusion, and disposed on a top surface of the lower seal member, an upper end of the lower stopper being spaced apart from the partition disk, wherein the orifice holes of the partition disk are formed between the upper support protrusion and the upper stopper and between the lower support protrusion and the lower stopper.

The damping force variable type shock absorber may further include: a ring-shaped upper connection groove concavely formed on a top surface of the upper seal member; an upper metal ring mounted on the upper connection groove; a ring-shaped lower connection groove concavely formed on a bottom surface of the lower seal member; and a lower metal ring mounted on the lower connection groove.

BRIEF DESCRIPTION OF THE DRAWINGS

FIG. 1 is a schematic cross-sectional view illustrating an overall configuration of a damping force variable type shock absorber according to an embodiment of the present invention.

FIG. 2 is a partial cutaway exploded perspective view illustrating an overall configuration of a first damping unit and a second damping unit, which are main parts of the damping force variable type shock absorber according to the embodiment of the present invention.

FIG. 3 is a schematic cross-sectional view illustrating a flow passage of a working fluid during a compression stroke of the damping force variable type shock absorber according to the embodiment of the present invention.

FIG. 4 is a schematic cross-sectional view illustrating a flow passage of a working fluid during a rebound stroke of the damping force variable type shock absorber according to the embodiment of the present invention.

DETAILED DESCRIPTION OF EXEMPLARY EMBODIMENTS

The advantages and features of the present invention and methods for achieving them will become more apparent from the following embodiments that are described in detail in conjunction with the accompanying drawings.

However, the present invention is not limited to the following embodiments and may be embodied in various forms.

These embodiments are provided so that this disclosure will be thorough and complete, and will fully convey the scope of the invention to those skilled in the art.

The scope of the present invention is defined by the appended claims.

Therefore, in some embodiments, detailed descriptions of well-known elements, operations, and technologies will be omitted since they would unnecessarily obscure the subject matters of the present invention.

Throughout the disclosure, like reference numerals refer to like elements. The terminology used herein is for the purpose of describing particular embodiments only and is not intended to limit the present invention.

In this specification, the singular forms "a", "an", and "the" are intended to include the plural forms as well, unless the context clearly indicates otherwise. It will be understood that terms such as "comprise", "include", and "have", when used herein, specify the presence of stated elements and operations, but do not preclude the presence or addition of one or more other elements and operations.

Unless otherwise defined, all terms used herein, including technical and scientific terms, have the same meaning as commonly understood by one of ordinary skill in the art to which the inventive concept belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described with reference to the accompanying drawings.

FIG. 1 is a schematic cross-sectional view illustrating an overall configuration of a damping force variable type shock absorber according to an embodiment of the present invention. FIG. 2 is a partial cutaway exploded perspective view illustrating an overall configuration of a first damping unit and a second damping unit, which are main parts of the damping force variable type shock absorber according to the embodiment of the present invention.

As illustrated in FIGS. 1 and 2, the damping force variable type shock absorber includes a cylinder 10, a piston rod 30, a piston valve 20, and an auxiliary valve 100. The auxiliary valve 100 includes a housing 110, first and second damping units I and II, and a seal unit III.

The cylinder 10 may include an inner tube 11 forming an inner space, and an outer tube 12 provided outside the inner tube 11.

The inner tube 11 may have a cylindrical shape to form the inner space, and the inner tube 11 is filled with a fluid (oil or the like).

The inside of the inner tube 11 may be partitioned into a compression chamber 11a and a rebound chamber 11b by the piston valve 20, which will be described below.

The outer tube 12 is provided outside the inner tube 11 and has a larger diameter than the inner tube 11. The outer tube 12 may have a shape corresponding to the inner tube 11.

As illustrated in FIG. 1, a reservoir 40 may be formed between the inner tube 11 and the outer tube 12. The reservoir 40 is separated from the compression chamber 11a by a body valve 50.

That is, during a compression stroke of the piston rod 30, which will be described below, the fluid inside the compression chamber 11a may move to the reservoir 40 through a passage of the body valve 50.

In contrast, during a rebound stroke of the piston rod 30, which will be described below, the fluid inside the reservoir 40 may move to the compression chamber 11a through the passage of the body valve 50.

In addition, the compression stroke and the rebound stroke may be performed in a state in which one end of the outer tube 12 and one end of the piston rod 30, which will be described below, are connected to a vehicle body side or a wheel side of a vehicle.

In addition, a separate connection portion (not illustrated) for connection to the vehicle body side or the wheel side may be installed in a lower end of the outer tube 12.

The piston valve 20 partitions the inside of the inner tube 11 into the compression chamber 11a and the rebound chamber 11b. The piston valve 20 generates a damping force due to a resistance of the fluid while reciprocating within the inner tube 11.

For example, when the piston valve 20 performs the compression stroke, a pressure of the compression chamber 11a becomes higher than a pressure of the rebound chamber 11b.

Due to the increase in the pressure of the compression chamber 11a, the fluid filling the compression chamber 11a moves to the rebound chamber 11b through the passage while pushing a valve unit.

In contrast, when the piston valve 20 performs the rebound stroke, the fluid moves in a direction reverse to that of the compression stroke procedure.

One end of the piston rod 30 is connected to the piston valve 20 and the other end of the piston rod 30 extends to the outside of the outer tube 12, such that the piston rod 30 is connected to the vehicle body side or the wheel side of the vehicle.

The body valve 50 is installed at a lower end of the compression chamber 11a and separates the compression chamber 11a from the reservoir 40.

At this time, the fluid moves upward or downward through the passage of the body valve 50, and the damping force is generated by a resistance of the fluid while the fluid moves in rebound and compression stroke directions.

Disks for opening and closing a pressure passage in a selected direction are provided above and under the body valve 50.

For example, when the piston rod 30 and the piston valve 20 perform the compression stroke (downward in the illustrated direction), the fluid moves to the reservoir 40 through the passage of the body valve 50.

In contrast, when the piston rod 30 and the piston valve 20 perform the rebound stroke (upward in the illustrated direction), the fluid moves in a direction reverse to that of the above-described operation.

The connection passage 60 is formed inside the piston rod 30 and communicates the compression chamber 11a with the rebound chamber 11b through the piston valve 20.

When the piston rod 30 and the piston valve 20 perform a high-frequency stroke, the auxiliary valve 100 bypasses the fluid of the compression chamber 11a and the rebound chamber 11b to generate a soft damping force.

To this end, the auxiliary valve 100 includes the first and second damping units I and II and the seal unit III, which are provided inside the housing 110.

The housing 110 includes an auxiliary chamber 111 communicating with the connection passage 60 penetrating an inside of the piston rod 30 in a longitudinal direction of the piston rod 30, and is connected to a lower portion of the piston valve 20 and forms an auxiliary passage 112 connected to the compression chamber 11a disposed thereunder.

The first damping unit I is disposed in an upper side of the auxiliary chamber 111 to form a first bypass passage (corresponding to a portion including an upper curve in a curved arrow indicated in a zigzag form in FIG. 1) communicating the connection passage 60 with the auxiliary passage 112 in a zigzag form. The first damping unit I allows a deformation (a vertical double-headed arrow indicated in an upper side in FIG. 1) according to the flow of the working fluid in a predetermined speed section.

The second damping unit II is accommodated in the auxiliary chamber 111 and disposed under the first damping unit I to form a second bypass passage (corresponding to a portion including a lower curve in a curved arrow indicated in a zigzag form) connected to the first bypass passage. The second damping unit II allows a deformation (a vertical double-headed arrow indicated in a lower side in FIG. 1) according to the flow of the working fluid in a predetermined speed section.

The seal unit III is accommodated in the auxiliary chamber 111 and disposed under the first damping unit I to vertically support the second damping unit II.

In addition to the above-described embodiment, the following various embodiments can also be applied to the present invention.

More specifically, the first damping unit I includes a first bypass disk 230 between a first spacer ring 210 and a second spacer ring 220, and a second bypass disk 240 between the second spacer ring 220 and the seal unit III.

The first spacer ring 210 is a ring-shaped member contacting an edge of an inner top surface of the auxiliary chamber 111, and the second spacer ring 220 is a ring-shaped member disposed under the first spacer ring 210.

The first bypass disk 230 is a circular-plate-shaped member disposed between the first spacer ring 210 and the second spacer ring 220 and including a first bypass orifice hole 231 with a predetermined diameter at a position spaced apart from the center thereof by a predetermined distance.

That is, upper and lower edges of the first bypass disk 230 are elastically supported so as to allow a deformation according to the flow of the working fluid between the first spacer ring 210 and the second spacer ring 220.

The second bypass disk 240 is a circular-plate-shaped member disposed between the second spacer ring 220 and the seal unit III and including a second bypass orifice hole 241 with a predetermined diameter at the center thereof.

That is, upper and lower edges of the second bypass disk 240 are elastically supported so as to allow a deformation according to the flow of the working fluid between the second spacer ring 220 and the seal unit III.

More specifically, the seal unit III includes an upper seal member 120 and a lower seal member 130. The center of the upper seal member 120 is penetrated vertically and an upper support protrusion 121 protrudes along a lower edge of the upper seal member 120. The lower seal member 130 is disposed under the upper seal member 120 to support the second damping unit II. The center of the lower seal member 130 is penetrated vertically and a lower support protrusion 131 protrudes along an upper edge of the lower seal member 130.

The second damping unit II includes a partition disk 140, edges of which are supported by the upper support protrusion 121 and the lower support protrusion 131. The partition disk 140 partitions the auxiliary chamber 111 into an upper chamber and a lower chamber. An orifice hole 141 penetrates through the partition disk 140 so as to vertically move the working fluid during the compression stroke and the rebound stroke.

The second damping unit II may include an upper support disk 125 and a lower support disk 135, in addition to the partition disk 140.

The upper support disk 125 is a ring-shaped member disposed at an upper edge of the partition disk 140 such that the orifice hole 141 is positioned in an inner space formed by the seal unit III.

The lower support disk 135 is a ring-shaped member disposed at a lower edge of the partition disk 140 such that the orifice hole 141 is positioned in the inner space formed by the seal unit III.

Therefore, upper and lower edges of the partition disk 140 are elastically supported so as to allow a deformation according to the flow of the working fluid between the upper support disk 125 and the lower support disk 135.

Mores specifically, the seal unit III includes an upper stopper 124 and a lower stopper 134, in addition to the upper and lower seal members 120 and 130.

The upper stopper 124 is an annular member spaced apart from the upper support protrusion 121 by a predetermined distance, disposed to be concentric with the upper support protrusion 121, and disposed on a bottom surface of the upper seal member 120, a lower end of the upper stopper 124 being spaced apart from the partition disk 140.

The lower stopper 134 is an annular member spaced apart from the lower support protrusion 131 by a predetermined distance, disposed to be concentric with the lower support protrusion 131, and disposed on a top surface of the lower seal member 130, an upper end of the lower stopper 134 being spaced apart from the partition disk 140.

That is, the upper and lower stoppers 124 and 134 allow the deformation of the partition disk 140 according to the flow of the working fluid but are intended to prevent the partition disk 140 from being excessively deformed beyond a predetermined degree, so as to prevent the partition disk 140 from being damaged or becoming a restoration-impossible state due to excessive deformation.

At this time, the orifice holes 141 are formed between the upper support protrusion 121 and the upper stopper 124 and between the lower support protrusion 131 and the lower stopper 134 to thereby form the second bypass passage as described above.

In order to improve durability, the damping force variable type shock absorber according to the present invention further includes a ring-shaped upper connection groove 122 concavely formed on the top surface of the upper seal member 120, an upper metal ring 123 mounted on the upper connection groove 122, a ring-shaped lower connection groove 132 concavely formed on the bottom surface of the lower seal member 130, and a lower metal ring 133 mounted on the lower connection groove 132.

The behavior of the working fluid during the compression stroke and the rebound stroke in the damping force variable type shock absorber according to the present invention will be described with reference to FIGS. 3 and 4.

FIG. 3 is a schematic cross-sectional view illustrating the flow passage of the working fluid during the compression stroke of the damping force variable type shock absorber according to the embodiment of the present invention. FIG. 4 is a schematic cross-sectional view illustrating the flow passage of the working fluid during the rebound stroke of the damping force variable type shock absorber according to the embodiment of the present invention.

When the piston rod 30 and the piston valve 20 perform a high-frequency compression stroke, the working fluid of the compression chamber 11a is introduced into the lower chamber of the auxiliary chamber 111 through the auxiliary passage of the auxiliary valve 100 as illustrated in FIG. 3.

The partition disk 140 is bent upward by the pressure of the working fluid.

At this time, the working fluid of the compression chamber 11a is introduced into the upper chamber of the auxiliary chamber 111 through a gap between the lower stopper 134 and the partition disk 140, the orifice hole 141, and a gap between the partition disk 140 and the upper stopper 124.

Therefore, the second bypass passage is formed by the behavior of the working fluid.

Then, the first bypass disk 230 and the second bypass disk 240 may be bent upward by the pressure of the working fluid.

At this time, the working fluid extends from the upper end of the second bypass passage, moves in the order of the second bypass orifice hole 241 and the first bypass orifice hole 231, and is introduced into the connection passage 60.

In contrast, when the piston rod 30 and the piston valve 20 perform a high-frequency rebound stroke, the working fluid of the rebound chamber 11b is introduced into the upper chamber of the auxiliary chamber 111 through the connection passage 60 as illustrated in FIG. 4.

Here, the first bypass disk 230 and the second bypass disk 240 may be bent downward by the pressure of the working fluid.

At this time, the working fluid introduced from the connection passage 60 into the auxiliary chamber 111 through the first bypass orifice hole 231 and the second bypass orifice hole 241, thereby forming the first bypass passage.

Then, the partition disk 140 is bent downward by the pressure of the working fluid.

At this time, the working fluid of the rebound chamber 11b is introduced into the lower chamber of the auxiliary chamber 111 through a gap between the upper stopper 124 and the partition disk 140, the orifice hole 141, and a gap between the partition disk 140 and the lower stopper 134.

As such, while the central portion of the partition disk 140 vibrates vertically, the working fluid is mutually moved to the compression chamber 11a and the rebound chamber 11b through the connection passage 60 and the auxiliary passage 112. Therefore, it is possible to generate a soft damping force during a high-frequency stroke.

In contrast, when the piston rod 30 and the piston valve 20 perform a low-frequency (low-speed or medium-speed) compression or rebound stroke, the working fluid is mutually moved to the compression chamber 11a and the rebound chamber 11b through the main passage of the piston valve 20 as illustrated in FIG. 1.

At this time, when the piston rod 30 and the piston valve 20 perform a low-frequency compression or rebound compression stroke, a large amount of working fluid brings the partition disk 140 into close contact with the upper stopper 124 or the lower stopper 134 and thus the bypass passage is blocked. In addition, the fluid of the compression chamber 11a and the rebound chamber 11b is mutually moved through the main passage of the piston valve 20 to thereby generate a hard damping force.

Furthermore, in the case of the low-frequency rebound stroke, the first bypass disk 230 is bent downward by a large amount of working fluid coming from the connection passage 60, and the second bypass orifice hole 241 of the second bypass disk 240 is closed, thereby blocking the first bypass passage.

Consequently, since the soft damping force is generated by the bypass of the fluid through the first and second damping units I and II during the high-frequency operation of the piston valve 20 of the piston rod 30, the damping force can be varied according to the traveling speed of the vehicle, thereby improving ride comfort.

Since the soft damping force can be generated during the high-speed or medium-speed traveling by using the first and second damping units I and II, a manufacturing cost can be reduced.

In addition, since the structure is simple, it is possible to improve durability and minimize occurrence of noise due to the contact between parts.

The basic technical idea of the present invention is to provide the damping force variable type shock absorber which implements the soft damping force by bypassing the working fluid while allowing the deformation according to the flow of the working fluid in a predetermined speed section, thereby improving ride comfort.

It is apparent to those skilled in the art that various modifications and applications can also be made without departing from the basic technical spirit of the present invention.

What is claimed is:

1. A damping force variable type shock absorber comprising:
    a cylinder filled with a fluid;
    a piston rod reciprocating within the cylinder;
    a piston valve connected to the piston rod to partition the cylinder into a compression chamber and a rebound chamber;
    a housing including an auxiliary chamber communicating with a connection passage penetrating an inside of the piston rod in a longitudinal direction of the piston rod, the housing being connected to a lower portion of the piston valve and forming an auxiliary passage connected to the compression chamber disposed thereunder;
    a first damping unit disposed in an upper side of the auxiliary chamber to form a first bypass passage communicating the connection passage with the auxiliary passage in a zigzag form, the first damping unit allowing a deformation according to a flow of a working fluid in a predetermined speed section;
    a second damping unit accommodated in the auxiliary chamber and disposed under the first damping unit to form a second bypass passage connected to the first bypass passage, the second damping unit allowing a deformation according to the flow of the working fluid in a predetermined speed section; and
    a seal unit accommodated in the auxiliary chamber and disposed under the first damping unit to vertically and elastically support upper and lower edges of the second damping unit, allowing a central portion of the second damping unit to be bent upwardly or downwardly,
    wherein the first damping unit comprises:
    a first spacer ring contacting an edge of an inner top surface of the auxiliary chamber;
    a second spacer ring disposed under the first spacer ring; and
    a first bypass disk disposed between the first spacer ring and the second spacer ring and including a first bypass orifice hole at a position spaced apart from a center thereof by a predetermined distance.

2. The damping force variable type shock absorber according to claim 1, further comprising a second bypass disk disposed between the second spacer ring and the seal unit and including a second bypass orifice hole penetrating through a center thereof.

3. The damping force variable type shock absorber according to claim 1,
    wherein the seal unit comprises:
    an upper seal member, wherein a center of the upper seal member penetrates vertically and an upper support protrusion protrudes along a lower edge of the upper seal member; and
    a lower seal member disposed under the upper seal member to support the second damping unit, wherein a center of the lower seal member is penetrated vertically and a lower support protrusion protrudes along an upper edge of the lower seal member.

4. The damping force variable type shock absorber according to claim 3, further comprising:
    a ring-shaped upper connection groove concavely formed on a top surface of the upper seal member;
    an upper metal ring mounted on the upper connection groove;
    a ring-shaped lower connection groove concavely formed on a bottom surface of the lower seal member; and
    a lower metal ring mounted on the lower connection groove.

5. The damping force variable type shock absorber according to claim 1,
    wherein the second damping unit comprises:
    a partition disk, upper and lower edges of which are supported by the seal unit, the partition disk partitioning the auxiliary chamber into an upper chamber and a lower chamber, an orifice hole penetrating through the partition disk so as to allow the working fluid to vertically move during a compression stroke and a rebound stroke;
    a ring-shaped upper support disk disposed at the upper edge of the partition disk such that the orifice hole is positioned in an inner space formed by the seal unit; and
    a ring-shaped lower support disk disposed at the lower edge of the partition disk such that the orifice hole is positioned in the inner space formed by the seal unit.

6. The damping force variable type shock absorber according to claim 5,
    wherein the seal unit comprises:
    an upper seal member, wherein a center of the upper seal member is penetrated vertically and an upper support protrusion protrudes along a lower edge of the upper seal member;
    a ring-shaped upper stopper spaced apart from the upper support protrusion by a predetermined distance, disposed to be concentric with the upper support protrusion, and disposed on a bottom surface of the upper seal member, a lower end of the upper stopper being spaced apart from the partition disk;
    a lower seal member disposed under the upper seal member to support the second damping unit, wherein a center of the lower seal member is penetrated vertically and a lower support protrusion protrudes along an upper edge of the lower seal member; and
    a ring-shaped lower stopper spaced apart from the lower support protrusion by a predetermined distance, disposed to be concentric with the lower support protrusion, and disposed on a top surface of the lower seal member, an upper end of the lower stopper being spaced apart from the partition disk,
    wherein the orifice holes of the partition disk are formed between the upper support protrusion and the upper stopper and between the lower support protrusion and the lower stopper.

7. The damping force variable type shock absorber according to claim 6, further comprising:
    a ring-shaped upper connection groove concavely formed on a top surface of the upper seal member;
    an upper metal ring mounted on the upper connection groove;
    a ring-shaped lower connection groove concavely formed on a bottom surface of the lower seal member; and
    a lower metal ring mounted on the lower connection groove.

* * * * *